March 12, 1929.　　C. E. GARDNER, SR., ET AL　　1,705,182
PROPORTIONAL TOOL
Filed Sept. 17, 1925
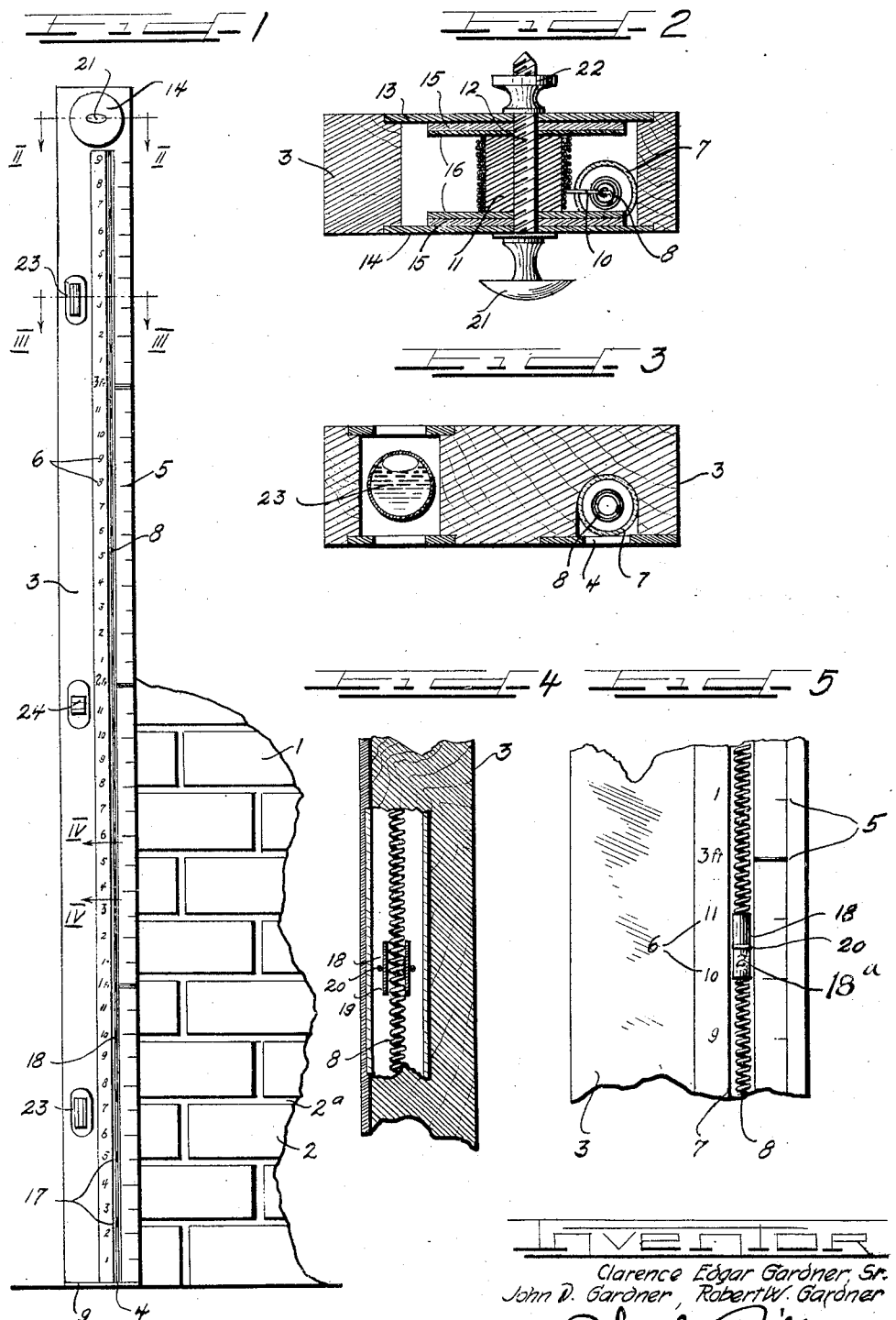
INVENTOR
Clarence Edgar Gardner, Sr.
John D. Gardner, Robert W. Gardner
BY Charles W. Hills
ATTYS Patented Mar. 12, 1929.

1,705,182

UNITED STATES PATENT OFFICE.

CLARENCE EDGAR GARDNER, SR., JOHN D. GARDNER, AND ROBERT W. GARDNER, OF CHICAGO, ILLINOIS.

PROPORTIONAL TOOL.

Application filed September 17, 1925. Serial No. 56,788.

This invention relates to a proportional tool and more particularly to a device for dividing various given distances into desired numbers of equal divisions.

When laying bricks in construction work, it is often necessary to have the brick work terminate at a given height. As it is impractical to split a brick, the brick layer must calculate accurately the number of courses of brick that are to be layed and then vary the amount of mortar that he uses, to come out right. It is customary for a brick layer to use a rule to determine the height to be filled with brick and then to improvise a measuring and checking instrument by dividing a rod into a number of equal divisions corresponding to the number of courses of brick required.

It is an object of this invention to provide a device for quickly and accurately determining the average height which a course of bricks must be in order to come out even at any given height of the construction.

It is further an object of this invention to provide a combination leveling and proportional tool.

It is an important object of this invention to provide a proportional tool wherein a member having a number of divisions thereon may be extended and at the same time retain said divisions in the same relative proportions.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevational view of a proportional tool embodying the principles of our invention and showing its application.

Figure 2 is an enlarged sectional view taken on line II—II of Figure 1, with parts in elevation.

Figure 3 is an enlarged sectional view taken on line III—III of Figure 1.

Figure 4 is an enlarged sectional view taken on line IV—IV of Figure 1.

Figure 5 is an enlarged fragmentary view.

As shown on the drawings:

The proportional tool of our invention is especially adapted for use in laying brick and is shown in Figure 1 alongside a brick wall 1 made up of courses of brick 2. Each course 2 includes the vertical height of one brick and one-half of the thickness of the mortar $2^a$ on either side of it. My device comprises a straight edge bar 3 formed of wood or metal and having a groove 4 extending parallel to the length thereof and adjacent one of the edges of said bar. Said edge is layed off in suitable units of linear measure, such as inches and feet, as indicated by the lines of marking 5 and numerals 6. A glass tube 7 is positioned in said groove 4 and extends substantially the length thereof. A spiral spring 8 is housed within said glass tube 7, one end of said spring being secured to an end plate 9 and the other end of said spring being fastened to a cable or chain 10. Said cable 10 is secured to and adapted to be wound upon a drum 11 mounted in the other end of said bar 3. A threaded bolt 12 forms the axis of said drum and extends through plates 13 and 14 secured on the back and front sides, respectively, of bar 3. Washers 15 are provided between the flanged ends 16 of said drum 11 and the plates 13 and 14.

The spring 8 is marked off into equal divisions 17 of suitable size by markers 18 which may be consecutively numbered as at $18^a$. Said markers 18 comprise each a sleeve 19 enclosing the spring 8 and secured to one winding thereof and a pointer 20 fastened on the outside of said sleeve intermediate its ends. Said pointer 20 may suitably be a narrow band or ring encircling the sleeve 19 and soldered or otherwise secured to said sleeve in such position that the distances between successive pointers will be exactly equal. The spring 8 may accordingly be stretched by turning or revolving the drum 11 by means of its handle or knob 21. When a desired stretch is obtained, the drum 11 is held against rotation by tightening a nut 22 on the projecting end of the bolt 12.

It is obvious that when the spring 8 is stretched or allowed to contract that the divisions 17 will still remain equal, since the stretch or contraction of the spring is uniform throughout its length.

The bar 3 also serves as a level and for this purpose is provided with a plurality of horizontal bubble level indicators 23 and a vertical level indicator 24 of the usual type. The bar may thus be used either as a level for horizontal or a plumb for vertical surfaces.

We have found that our device is of great practical assistance in the art of brick laying.

In building construction it is often necessary to determine the number of courses of brick that will be required for a given height of the building. In this case it is only necessary to lay a few courses of brick and then place my proportional tool in vertical position against the surface of the wall. The spring 8 is then stretched or contracted so that a marker 20 lies opposite the top of each course of brick, as will be the case if the courses are all of equal height. It is a simple matter then to compute from the number of courses to a unit of length the number of courses that will be required for the given height. The brick layer will also be able to check up on the subsequent courses of brick laid to see that he is getting the proper height to each course. By adjusting the amount of mortar used between the bricks, he can follow very accurately the average height per course as indicated on my proportional tool. He can also use the tool to make sure that the bricks are being laid on a plumb line. Another case in which our proportional tool is of practical importance is where the brick layer must figure how many courses to lay up to an opening the structure. To do this, he merely measures on the linear scale 5 the distance to the edge of said opening and then adjusts the spring 8 so as to bring a marker 20 opposite the height, as indicated on the scale 5, making sure to adjust the distance between the markers 20 as nearly equal as possible to the average height of a course of bricks. He then sets the spring 8 to this position by tightening up the nut 22 to prevent rotation of the drum 11. He then lays his bricks in accordance with the distances spaced off by the markers 20 on the spring 8.

It is of course apparent that a proportional tool embodying the principles of this invention may be effectively used in the laying out of proportional divisions in various kinds of work as enlarging drawings and the like.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A proportional tool comprising a straight edged bar having a groove extending the length thereof adjacent to and spaced from said straight edge, there being a linear scale laid off on said edge, a spiral spring within said groove, equally spaced pointers on said spring and supported solely thereby out of contact with the bar and means for stretching said spring.

2. In a proportional tool, a helical uniformly elongatable spring, spaced cylindrical sleeves enclosing portions of said spring and each sleeve secured to a single convolution of the spring, and a series of pointers in equally spaced relation along the spring, each pointer being carried by one of said sleeves.

3. A proportional tool comprising a bar having a straight edge provided with a lineal scale laid off thereon, said bar having a groove paralleling and spaced from the said straight edge, a uniformly elongatable member disposed in protected relation along and within said groove, pointers carried by the said member and operating therewith wholly within the groove, and means for elongating the said member.

4. A proportional tool comprising a straight edged bar having a groove paralleling said straight edge, a uniformly elongatable member disposed and operating in protected relation along and within said groove, means for elongating said member, and a plurality of pointers carried by said member and supported wholly thereby within the said groove and in spaced relation to the wall of the groove.

In testimony whereof we have hereunto subscribed our names.

CLARENCE EDGAR GARDNER, Sr.
ROBERT W. GARDNER.
JOHN D. GARDNER.